United States Patent [19]
Maxson

[11] Patent Number: 5,569,698
[45] Date of Patent: Oct. 29, 1996

[54] FLUORINATED POLYDIORGANOSILOXANE BASE COMPOSITION AND METHOD FOR PREPARATION

[75] Inventor: Myron T. Maxson, Sanford, Mich.

[73] Assignee: Dow Corning Corporation, Midland, Mich.

[21] Appl. No.: 557,403

[22] Filed: Nov. 13, 1995

[51] Int. Cl.$^6$ ....................................................... C08K 3/34
[52] U.S. Cl. ........................ 524/493; 524/847; 525/477; 525/478; 528/15; 528/42
[58] Field of Search ...................... 528/15, 42; 524/493, 524/847; 525/477, 478

[56] References Cited

U.S. PATENT DOCUMENTS

| | | | |
|---|---|---|---|
| 3,776,934 | 12/1973 | Toporcer et al. | 260/448.2 N |
| 4,020,044 | 4/1977 | Crossan et al. | 260/46.5 |
| 5,171,773 | 12/1992 | Chaffee et al. | 524/493 |

Primary Examiner—Melvyn I. Marquis
Attorney, Agent, or Firm—William F. Boley

[57] ABSTRACT

A method for making a fluorinated polydiorganosiloxane base composition and the composition prepared thereby. The base composition can be addition cured using a platinum-metal group catalyst and an organohydrogensiloxane crosslinker to form a fluorosilicone elastomer having improved resiliency and compression set properties.

26 Claims, No Drawings

FLUORINATED POLYDIORGANOSILOXANE BASE COMPOSITION AND METHOD FOR PREPARATION

BACKGROUND OF INVENTION

The present invention is a method for making a fluorinated polydiorganosiloxane base composition and the composition prepared thereby. The base composition can be addition cured using a platinum-metal group catalyst and an organohydrogensiloxane crosslinker to form a fluorosilicone elastomer having improved resiliency and compression set properties.

Toporcer et al., U.S. Pat. No. 3,776,934, teach methylvinyldi(N-methylacetamido)silane and its manufacture. The amidosilane is taught useful as a chain extender in organosiloxane compositions.

Crossan et al., U.S. Pat. No 4,020,044, teach mixing a methylvinyldi(N-alkylacetamido) silane and hydroxyl endblocked polydiorganosiloxane and allowing the mixture to react at room temperature to provide a polydiorganosiloxane having increased molecular weight and methylvinylsiloxane units in the chain. Crossan et al. report the gums produced can be crosslinked through the use of organic peroxides.

Chaffee et al., U.S. Pat. No. 5,171,773, teach that a fluorinated polydiorganosiloxane elastomer having improved physical properties can be obtained through the use of a method which first reacts a hydroxyl endblocked methyl(fluoropropyl)siloxane having a Williams plasticity number greater than 5.7 mm with a methylvinyldi(N-alkylacetamido)silane to give a chain-extended polymer having pendant vinyl groups only at the location of the chain extension. Chaffee et al. teach the chain extend polymer can be mixed with a fumed silica having a surface area of about 400 m$^2$/g. The resulting composition can be peroxide cured to form a silicone elastomer.

SUMMARY OF INVENTION

The present invention is a method for making a fluorinated polydiorganosiloxane base composition and the composition prepared thereby. The base composition can be addition cured using a platinum-metal group catalyst and an organohydrogensiloxane crosslinker to form a fluorosilicone elastomer having improved resiliency and compression set properties.

DESCRIPTION OF INVENTION

The present invention is a method for making a fluorinated polydiorganosiloxane base composition and the composition prepared thereby. The method comprises:

(A) mixing (i) 100 parts by weight of a hydroxyl end-terminated polymethylvinyl(methylfluoroalkyl)siloxane having about 0.2 to 1.2 mole percent pendant vinyl substituted on silicon and a Williams plasticity number of about 1.3 mm to 3.8 mm at 25° C. and (ii) 0.05 to two parts by weight of a methylvinyl(N-alkylacetamido)silane at a temperature within a range of about 20° C. to 80° C., for a period of time sufficient to increase the Williams plasticity number of the polymethylvinyl(methylfluoroalkyl)siloxane by chain extension, (B) mixing with the product of step (A)
 (i) 0.5 to 10 parts by weight of a hydroxyl end-terminated polydimethylsiloxane having about one to six mole percent pendant vinyl substitution on silicon and a Williams plasticity number within a range of about 1.2 mm to 2.5 mm at 25° C.,
 (ii) one to 10 parts of a hydroxyl end-terminated polymethylfluoroalkylsiloxane fluid where the terminal hydroxyl substitution comprises about three to 10 weight percent of the fluid, and
 (iii) 20 to 50 parts of a reinforcing silica having a surface area within a range of about 50 m$^2$/g to less than 200 m$^2$/g, and (C) heating the mixture of step (B) to remove volatiles.

In a preferred process, step (B) further comprises adding 0.25 to 5 parts by weight of a hydroxyl end-terminated polydimethylsiloxane fluid having about nine to 12 weight percent vinyl substituted on silicon and a viscosity of about 10 mPa·s to 60 mPa·s at 25° C.

The hydroxyl end-terminated polymethylvinyl(methylfluoroalkyl)siloxane (component (A)(i)) comprises about 0.2 to 1.2 mole percent pendant vinyl substitution on silicon (i.e. 0.2 to 1.2% of the pendant substituents on silicon atoms are vinyl groups) and has a Williams plasticity number within a range of about 1.3 mm to 3.8 mm at 25° C. as determined by ASTM 926-67. Component (A)(i) is endblocked with hydroxydimethylsiloxy units and comprises repeating units described by formulas —(R$_f$MeSiO)— and —(ViMeSiO)—, where R$_f$ is a perfluoroalkylethyl radical comprising three to 10 carbon atoms, Me is methyl, and Vi is vinyl. Preferred is when R$_f$ is 3,3,3-trifluoropropyl. It is preferred that component (A)(i) comprise about 0.5 to 0.8 mole percent pendant vinyl substituted on silicon and have a Williams plasticity number within a range of about 2.3 mm to 3.1 mm at 25° C.

In the present method, component (A) (i) is added to a high-shear mixer capable of being heated and maintained under an inert environment. Such a mixer is described in the examples herein. In the preferred process, component (A) (i) is added to the mixer and heated to a temperature less than about 80° C. under a dry nitrogen purge for a period of time sufficient to remove moisture present in component (A) (i).

Component (A) (i) is mixed with about 0.5 to two parts by weight of a methylvinyldi (N-alkylacetamido) silane (component (A) (ii)) per 100 parts by weight of component (A) (i). Examples of useful components (A) (ii) are described in Crossan et al., U.S. Pat. No. 4,020,044 which is hereby incorporated by reference. In component (A) (ii) the alkyl substituent bonded to nitrogen can comprise one to about four carbon atoms. The preferred component (A) (ii) is methylvinyldi(N-methylacetamido)silane. In the preferred process, Component (A) (i) and component (A) (ii) are mixed under a nitrogen purge at a temperature within a range of about 20° C. to 80° C. for a period of time sufficient to provide a product having a Williams plasticity number greater than that of component (A) (i). In the preferred method, component (A) (i) and component (A) (ii) are mixed until the mixture has reached an essentially stable viscosity.

The preferred method of this invention first dries component (A) (i) to remove any free water which would interfere with the reaction with component(A) (ii). Component (A) (ii) functions as a chain extender by reacting with the terminal hydroxyls of component (A) (i) first giving a N-alkylacetamidosilyl endblock on the polymer, then when that endblock reacts with another hydroxyl endblock on another polymer chain, the chains are joined together, giving a vinyl pendant group at the point where the two chains are joined by the silane. The minimum useful amount of component (A) (ii) is about 0.05 part by weight per 100 parts by weight of component (A) (i), in order to obtain any significant chain extension of component (A) (i). Preferably there is about 0.1 to 1.5 parts by weight of component (A) (ii) added per 100 parts by weight of component (A) (i). Higher than two parts by weight of component (A) (ii) can be added but may negatively impact the physical properties, such as tensile strength, of cured elastomer formed from the resulting fluorinated polydiorganosiloxane base composition.

In step (A) of the present method, component (A) (ii) may be initially mixed with a portion of component (A) (i) and then cut back with one or more portion of the remainder of component (A) (i) during the mixing process of step (A).

In step (B) of the present method, the product of step (A) is mixed with components (B) (i) through (B) (iii) and optionally with component (B) (iv). This mixing is preferably performed in the mixer in which step (A) was conducted. In the preferred process components (B) (i) and (B) (ii) and optionally (B) (iv) are mixed with the product of step (A) at a temperature within a range of about 20° C. to 80° C. for an amount of time sufficient to ensure good dispersion of these components in the product of step (A). After the mixing is completed, the reinforcing silica (component (B) (iii)) is added to the mixer in one or more portion and massing of the mixer content effected after each addition.

In step (B), 0.5 to 10 parts by weight of a hydroxyl end-terminated polydimethylsiloxane having about one to six mole percent pendant vinyl substituted on silicon and a Williams plasticity number within a range of about 1.2 mm to 2.5 mm at 25° C. (component (B) (i) ) is added to the method per each 100 parts by weight of component (A) (i). Preferred is when about one to two parts by weight of component (B) (i) is added to the method per 100 parts by weight of component (A) (i).

In step (B), one to 10 parts by weight of a hydroxyl end-terminated polymethylfluoroalkylsiloxane fluid where the terminal hydroxyl substitution comprises about three to 10 weight percent of the fluid (component (B) (ii)) is added to the method per 100 parts by weight of the component (A) (i). Component (B) (ii) is described by formula HO(MeR$_f$SiO)$_n$H, where Me is methyl, R$_f$ is a perfluoroalkylethyl radical comprising three to 10 carbon atoms and n has a value of from three to 12. Preferred is when R$_f$ is 3,3,3-trifluoropropyl and n is a value within a range of about three to six. In the present method, component (B) (ii) serves to in situ surface treat the reinforcing silica to aid dispersion of the reinforcing silica and to prevent the phenomena typically referred to as "crepe" which can occur during storage of the compositions prepared by the present method. Creping is characterized by an increase in viscosity or plasticity of a composition to the extent that it becomes difficult or impossible to process using conventional techniques and equipment. The amount of component (B) (ii) added in the present method is related to the amount of reinforcing silica added to the method as well as the surface area of the reinforcing silica filler. In general one to 10 parts by weight of component (B) (ii) is considered useful for the possible range of reinforcing silica filler specified in the present method. A preferred range for component (B) (ii) is about three to six parts by weight per 100 parts by weight of component (A) (i), where the reinforcing silica filler (component (B) (iii)) comprises about 25 to 35 parts by weight of component (A) (i).

In step (B), 20 to 50 parts by weight of a reinforcing silica having a surface area within a range of about 50 m$^2$/g to less than 200 m$^2$/g (component (B) (iii)) is added to the method per 100 parts by weight of component (A) (i). Preferred is when about 25 to 35 parts by weight of component (B) (iii) is added to the method per 100 parts by weight of component (A) (i). The present inventors have unexpectedly found that platinum group metal catalyzed addition cured fluorosilicone rubbers prepared from the base composition of the present method have significantly lower compression set values and higher resiliency values when the reinforcing silica has a surface area less than about 200 m$^2$/g. Preferred is when the reinforcing silica has a surface area within a range of about 50 m$^2$/g to 150 m$^2$/g. Even more preferred is when the reinforcing silica has a surface area with a range of about 50 m$^2$/g to 100 m$^2$/g. The reinforcing silica can be fumed or precipitated silica, however fumed silica is preferred.

In step (B), optionally 0.25 to 5 parts by weight of hydroxyl end-terminated polydimethylsiloxane fluid having about nine to 12 weight percent pendant vinyl substituted on silicon and a viscosity of about 20 mPa·s to 60 mPa·s at 25° C. (component (B) (iv)) can be added to the method per 100 parts by weight of component (A) (i). Preferred is when about 0.5 to 2 parts by weight of component (B) (iv) is added to the method per 100 parts by weight of component (A) (i).

In step (C) of the present method, the mixture formed in step (B) is heated to remove volatile components of the mixture. The apparatus in which step (C) is conducted, preferably the mixer in which step (A) and step (B) was conducted, may be held under a reduced pressure and/or purged with a stream of inert gas such as nitrogen to facilitate removal of volatiles. In a preferred method, step (C) is conducted at a temperature within a range of about 100° C. to 200° C. Preferred is when step (C) is conducted at a temperature within a range of about 150° C. to 170° C.

The present method provides a fluorinated polydiorganosiloxane base composition which can be compounded with an addition-type cure system using a platinum group metal-containing catalyst to form cured fluorosilicone elastomers having improved compression set and resiliency properties.

Addition cure systems suitable for curing the fluorinated polydiorganosiloxane base composition require the presence of a platinum group metal or compound thereof catalyst and a siloxane crosslinker having silicon-bonded hydrogen. To improve shelf life of such catalyzed compositions, the curing system can also include the presence of an inhibitor of the platinum group metal catalyst, the inhibitor being removed from the composition or deactivated at elevated temperatures.

Platinum group metal-containing catalysts useful to catalyze curing of the present base composition can be any of those known to catalyze the reaction of silicon-bonded hydrogen atoms with silicon-bonded vinyl groups. By "platinum group metal" it is meant ruthenium, rhodium, palladium, osmium, iridium, and platinum. Examples of useful platinum group metal-containing catalyst can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalyst and methods for their preparation.

A group of platinum group metal-containing catalysts particularly useful in the present composition are the complexes prepared from chloroplatinic acid as described by Willing, U.S. Pat. No. 3,419,593, which is hereby incorporated by reference to show such complexes and their preparation. A preferred catalyst is a platinum-containing complex which is the reaction product of chloroplatinic acid and sym-divinyltetramethyldisiloxane. An even more preferred catalyst is a platinum-containing complex which is the reaction product of chloroplatinic acid with dimethylvinylsiloxy endblocked poly(methyl-3,3,3-trifluoropropyl)siloxane.

Other platinum group metal-containing catalyst useful for the cure of the base composition of the present method are those microencapsulated catalysts as described, for example, in Lee et al., U.S. Pat. No. 4,766,176, which is hereby incorporated by reference.

The amount of platinum group metal-containing catalyst that can be used to effect curing of the base composition is not narrowly limited as long as there is a sufficient amount to accelerate a reaction between silicon-bond hydrogen atoms of an organohydrogensiloxane crosslinker and the vinyl radicals of the chain extended polymethylvinyl(methylfluoroalkyl)siloxane product of step (A) of the method. The appropriate amount of the platinum group metal-containing catalyst will depend upon the particular catalyst used. In general as little as about 0.001 part by weight of platinum group metal for every one million parts (ppm) total weight of the composition to be cured may be useful. Preferably the amount of platinum group metal is at least one ppm, on the same basis. More preferred is about one to 10,000 ppm of platinum group metal, on the same basis. Most preferred is about five to 50 ppm of the platinum group metal, on the same basis.

Organohydrogensiloxanes useful as crosslinkers in curing the present base compositions are well known in the art and are described, for example, by Polmanteer et al., U.S. Pat. No. 3,697,473 and Lee et al., U.S. Pat. No. 3,989,668, which are hereby incorporated by reference to show examples of organohydrogensiloxane known in the art. The organohydrogensiloxane useful in the present compositions can be any of those having an average of at least three silicon-bonded hydrogen atoms per molecule and an average of no more than one silicon-bonded hydrogen atom per silicon atom. The remaining valences of the silicon atoms are satisfied by divalent oxygen atoms. The organohydrogensiloxane can be homopolymers, copolymers, and mixtures thereof which contain diorganosiloxane units, organohydrogensiloxane units, diorganohydrogensiloxy units triorganosiloxy units and SiO$_2$ units. Preferably the organohydrogensiloxane crosslinker is readily miscible with the base composition of the present method. A preferred organohydrogensiloxane crosslinker is described by the following formula

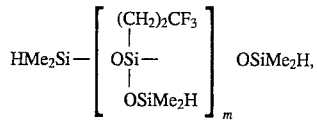

where Me is methyl and m is a value within a range of one to three.

The base composition comprising the platinum group metal-containing catalyst and the organohydrogensiloxane crosslinker may cure rapidly at room temperature. To hinder this curing process an inhibitor may be added to the composition. The inhibitor can be any of those materials known to inhibit the catalytic activity of platinum group metal-containing catalyst. By the term "inhibitor" it is meant a material that retards the room temperature curing of the composition when incorporated in the composition at less than about 10 weight percent of the composition, without preventing the elevated temperature curing of the composition.

A preferred class of inhibitors useful in the present composition are acetylenic alcohols as described in Kookootsedes et al., U.S. Pat. No. 3,445,420, which is incorporated herein by reference. Such acetylenic alcohols are exemplified by 1-ethynylcyclohexan-3-ol and 2-methyl-3-butyn-2-ol. Other examples of classes of inhibitors which may be useful as inhibitors in the present compositions include those described in Chung et al., U.S. Pat. No. 5,036,117, Janik, U.S. Pat. No. 4,584,361, and cyclic alkylvinylsiloxanes.

The amount of platinum group metal-containing catalyst inhibitor required is the amount needed to produce the desired shelf-life and/or pot-life and yet not extend the cure time of the curable composition to an impractical level. The amount will vary widely and will depend upon the particular inhibitor that is used, the nature and concentration of the platinum group metal-containing catalyst, and the nature of the organohydrogensiloxane crosslinker. Inhibitor added in amounts as small as one mole of inhibitor per mole of platinum group metal will in some instance cause a satisfactory inhibition of the catalyst. In other cases as much as 500 moles of inhibitor for every mole of platinum group metal may be needed to achieve the desired combination of pot life and cure time.

In addition to the above described cure components, catalyzed base compositions prepared by the present method can have added to them optional ingredients such as heat stabilizers, pigments, flame-retardants, electrically conductive materials, and thermally conductive materials.

To provide for improved shelf stability of curable compositions prepared using the base composition of the present method, the curable composition may be packaged in two parts with the platinum metal containing catalyst in one part and the organohydrogensiloxane crosslinker in the other part.

The following Examples are provided to illustrate the present invention. These examples are not intended to limits the scope of the claims herein.

Example 1. (Not within scope of invention) A fluorosilicone base composition similar to that described in Chaffee et al., U.S. Pat. No. 5,171,773 was cured to form a fluorosilicone elastomer using both a peroxide cure system and a platinum catalyst addition-type cure system. The peroxide cured fluorosilicone rubber was formed by adding to 100 weight parts base, 1 part by weight of cerium hydrate and 1 part by weight varox powder (2,5-bis(tert-butyl peroxy)-2,5-dimethyl hexane) as catalyst. Samples of the resulting mixture were press molded for 10 minutes at 171° C. and then post-cured for 4 hours at 200° C. in a hot air oven. Physicals properties of the resulting fluorosilicone elastomer were determined by standard test methods. The test methods and physical property data are reported in Table 1. The platinum cured fluorosilicone elastomer was formed by adding to 100 weight parts base, 1.6 parts by weight of an organohydrogensiloxane described by formula

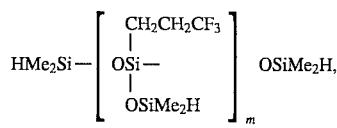

where Me is methyl, and m has a value of 1 to 3 with a distribution such that the organohydrogensiloxane had a viscosity of about 5 mPa·s, methyl butynol, and a complex formed by reacting hexachloroplatinic acid with dimthylvinylsiloxy terminated poly(methyl-3,3,3-trifluoropropyl)siloxane. Samples of the resulting mixture were press molded for 10 minutes at 171° C. and then post-cured for four hours at 200° C. in a hot air oven. Physical properties of the resulting fluorosilicone elastomer were determined and are reported in Table 1. The data provided in Table 1 demonstrate the low resiliency typically obtained with platinum curing of a fluorosilicone elastomer composition, in comparison with peroxide curing of the same composition.

TABLE 1

| | | Cure System | |
|---|---|---|---|
| Physical Property | Test Method | Peroxide | Platinum |
| Durometer (Shore A) | ASTM D2240 | 38 | 37 |
| Tensile, MPa | ASTM 412 | 8.5 | 3.0 |
| Tear (Die B), kN/m | ASTM D625 | 16.5 | 15.4 |
| Elongation, % | ASTM 412 | 358 | 509 |
| Resiliency (BS), % | ASTM D2632 | 34 | 25 |

Example 2. The effect of reinforcing silica particle size on a fluorinated polydiorganosiloxane base composition within the scope of the present invention was evaluated. A fluorinated polydiorganosiloxane base composition as described in Table 2 was prepared.

TABLE 2

| No. | Parts (Wt.) | Component |
|---|---|---|
| (1) | 100 | Hydroxyl end-terminated polymethylvinyl-(methyl-3,3,3-trifluoropropyl)siloxane having about 0.2 to 1.2 mole percent pendant vinyl substituted on silicon and a Williams plasticity number within a range of about 2.3 mm to 3.1 mm at 25° C. |
| (2) | 0.3 | Methylvinyldi(N-methylacetamido)silane. |
| (3) | 2.0 | Hydroxyl end-terminated polydimethylsiloxane having about one to six mole percent pendant vinyl substituted on silicon and a Williams plasticity number within a range of about 1.2 mm to 2.5 mm at 25° C. |
| (4) | 5.1 | Hydroxyl end-terminated polymethyl(3,3,3-trifluoropropyl)siloxane fluid where the terminal hydroxyl substitution comprises about 3 to 10 weight percent of the fluid. |
| (5) | 1.0 | Hydroxyl end-terminated polydimethylsiloxane having about 9 to 12 weight percent pendant vinyl substituted on silicon and a viscosity of about 20 mPa · s to 60 mPa · s at 25° C. |
| (6) | 28.6 | Reinforcing Silica. |

The base composition was prepared by placing about 80 weight percent of component (1) in a Baker Perkins sigma-blade mixer and heating to 52° C. with a nitrogen purge for 10 minutes. Component (2) was slowly added to the mixer with constant mixing. After completion of the addition of component (2), the mixing was continued for an additional 30 minutes at 52° C. under nitrogen purge. The remainder of component (1) and all of components (3), (4), and (5) were added to the mixer and mixing continued for an additional five minutes. Component (6) (Reinforcing Silica) was then added to the mixer in several increments and the mixer content massed between each addition. After completion of the addition of the reinforcing silica to the mixer, the mixer was heated at a temperature of 150° C. to 170° C. under vacuum with a slow nitrogen purge and mixing continued for 90 minutes. The mixture was cooled to about room temperature and mixed for 30 minutes as a final step in forming the base composition. The silicas tested in the base compositions were Cab-O-Sil® L-90 (surface area 90 m²/g), Cab-O-Sil MS-70 (surface area 100 m²/g) and Cab-O-Sil MS-75 (surface area 250 m²/g) all products of Cabot Corporation, Tuscola, Ill.

A curable fluorosilicone elastomer composition was made by adding per 100 weight parts of the base composition, 1.4 parts by weight of a 5 mPa·s organohydrogensiloxane crosslinker as described in Example 1, 3 parts by weight of a resin encapsulated platinum catalyst providing 15 ppm platinum (based on the weight of the base composition), 0.50 part by weight of cerium hydrate, and 0.05 part by weight of 1-ethynylcyclohexan-3-ol.

Samples of the fluorosilicone elastomer compositions were molded in a press for 10 minutes at 171° C. to cure and then post cured for four hours in a hot air oven at 200° C. Physical properties of the cured elastomer compositions were tested by methods referenced in Table 3 and the results of this testing are described in Table 3.

TABLE 3

| | | Silica Surface Area (m²/g) | | |
|---|---|---|---|---|
| Physical Property | Test Method | 90 | 200 | 250 |
| Durometer (Shore A) | ASTM D2240 | 37 | 43 | 42 |
| Tensile, MPa | ASTM 412 | 9.0 | 6.9 | 11.9 |
| Tear (Die B), kN/m | ASTM 625 | 15.9 | 22.2 | 27.3 |
| Elongation, % | ASTM 412 | 368 | 360 | 389 |
| Modulus (100%), MPa | ASTM 412 | 1.3 | 1.3 | 1.5 |
| Compression Set, % | ASTM D395 | 13 | 23 | 20 |
| Resiliency (BS), % | ASTM D2632 | 34 | 28 | 29 |

Example 3. The effects of varying catalyst concentration and crosslinker concentration as well as the effects of post curing on cured fluorosilicone elastomers prepared from the base composition described in Table 2 and prepared as described in Example 2 were evaluated. The cure systems used are described in Table 4 as No. 1, 2, and 3. The values for each of the components is expressed as weight parts per 100 weight parts of the base composition.

TABLE 4

| Description of Cure System Components | | | |
|---|---|---|---|
| Weight Parts | | | |
| No. 1 | No. 2 | No. 3 | Component Description |
| 1.4 | 2.0 | 1.0 | 5 mPa · s Polymethylhydrogen(methyl-3,3,3-trifluoropropyl)siloxane. |
| 0.0 | 0.0 | 0.4 | 5 mPa · s Trimethylsiloxy endblocked polydimethylsiloxane fluid having 0.5 weight percent hydrogen substituted on silicon. |
| 2.0 | 3.0 | 3.0 | Resin encapsulated platinum containing catalyst (0.15 weight percent platinum). |
| 0.05 | 0.05 | 0.05 | i-Ethynylcyclohexan-3-ol. |
| 0.5 | 0.5 | 0.5 | Cerium hydrate. |

Cured samples of the fluorosilicone rubber compositions using cured systems No. 1, 2, and 3 as described in Table 4 were prepared by molding in a press for 10 minutes at 171° C. The physical properties of these samples were measured by the methods described in Table 3 and the results are described in Table 5 under the heading "AM". Additional samples of the cured silicone elastomer molded as described above were post-cured for four hours in a hot air oven at 200° C. The physical properties of these samples are reported in Table 5 under the heading "PC".

TABLE 5

Effects of Varying Cure System Components and of Post-Curing

| | Cure System | | | | | |
|---|---|---|---|---|---|---|
| | No. 1 | | No. 2 | | No. 3 | |
| Physical Property | AM | PC | AM | PC | AM | PC |
| Durometer (Shore A) | 34 | 38 | 34 | 39 | 35 | 41 |
| Tensile, MPa | 9.1 | 8.9 | 8.3 | 8.9 | 9.3 | 7.4 |
| Tear (Die B), kN/m | 18.4 | 17.5 | 14.9 | 14.4 | 17.5 | 16.5 |
| Elongation, % | 431 | 347 | 349 | 320 | 399 | 284 |
| Modulus (100%), MPa | 1.0 | 1.4 | 1.3 | 1.6 | 1.2 | 1.5 |
| Compression Set, % | 28 | 12 | 20 | 11 | 31 | 12 |
| Resiliency (BS), % | 40 | 35 | 41 | 35 | 40 | 34 |

I claim:

1. A fluorinated polydiorganosiloxane base composition, the composition comprising:
   (A) the reaction product of
      (i) 100 parts by weight of a hydroxyl end-terminated polymethylvinyl(methylfluoroalkyl)siloxane having about 0.2 to 1.2 mole percent pendant vinyl substituted on silicon and a Williams plasticity number within a range of about 1.3 mm to 3.8 mm at 25° C., and
      (ii) 0.05 to two parts by weight of a methylvinyldi(N-alkylacetamido)silane,
   (B) (i) 0.5 to 10 parts by weight of a hydroxyl end-terminated polydimethylsiloxane having about one to six mole percent pendant vinyl substituted on silicon and a Williams plasticity number within a range of about 1.2 mm to 2.5 mm at 25° C.,
   (B) (ii) one to 10 parts of a hydroxyl end-terminated polymethylfluoroalkylsiloxane fluid where the terminal hydroxyl substitution comprises about three to 10 weight percent of the fluid, and
   (B) (iii) 20 to 50 parts of a reinforcing silica having a surface area within a range of about 50 m²/g to less than 200 m²/g.

2. A composition according to claim 1 further comprising (B) (iv) 0.25 to five parts by weight of hydroxyl end-terminated polydimethylsiloxane fluid having about nine to 12 weight percent pendant vinyl substituted on silicon and a viscosity of about 20 mPa·s to 60 mPa·s at 25° C.

3. A composition according to claim 1, where component (A) (i) comprises about 0.5 to 0.8 mole percent pendant vinyl substituted on silicon and has a Williams plasticity number within a range of about 2.3 mm to 3.1 mm at 25° C.

4. A composition according to claim 1, where component (A) (ii) is methylvinyldi(N-methylacetamido)silane.

5. A composition according to claim 1, where about 0.1 to 1.5 parts by weight of component (A) (ii) is added to the composition per 100 parts by weight of component (A) (i).

6. A composition according to claim 1, where about one to two parts by weight of component (B) (i) is added to the composition per 100 parts by weight of component (A) (i).

7. A composition according to claim 1, where component (B) (ii) is described by formula HO(MeR$_f$SiO)$_n$H and Me is methyl, R$_f$ is a perfluoroalkylethyl radical comprising three to 10 carbon atoms and n has a value of from three to 12.

8. A composition according to claim 7, where R$_f$ is 3,3,3-trifluoropropyl and n is a value within a range of about three to six.

9. A composition according to claim 1, comprising about three to six parts by weight of component (B) (ii) per 100 parts by weight of component (A) (i) and comprising about 25 to 35 parts by weight of component (B) (iii) per 100 parts by weight of component (A) (i).

10. A composition according to claim 1, where the reinforcing silica has a surface area within a range of about 50 m²/g to 150 m²/g.

11. A composition according to claim 1, where the reinforcing silica has a surface area within a range of about 50 m²/g to 100 m²/g.

12. A composition according to claim 2, where component (B) (iv) comprises about 0.5 to two parts by weight per 100 parts by weight of component (A) (i).

13. A composition according to claim 1 further comprising a platinum group metal or compound thereof catalyst and a siloxane crosslinker having silicon-bonded hydrogen atoms.

14. A composition according to claim 13, where the catalyst is the reaction product of chloroplatinic acid with dimethylvinylsiloxy endblocked poly(methyl-3,3,3-trifluoropropyl)siloxane.

15. A composition according to claim 13 were the siloxane crosslinker is described by formula

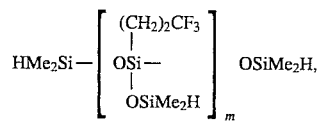

where Me is methyl and m has a value within a range of one to three.

16. A composition according to claim 13 further comprising an inhibitor of the catalyst.

17. A composition according to claim 16, where the inhibitor is an acetylenic alcohol.

18. A composition according to claim 13, where the composition is packaged in two parts with one part containing the catalyst and the second part the crosslinker.

19. A method of making a fluorinated polydiorganosiloxane base composition, the method comprising:
   (A) mixing (i) 100 parts by weight of a hydroxyl end-terminated polymethylvinyl(methylfluoroalkyl)siloxane having about 0.2 to 1.2 mole percent pendant vinyl substituted on silicon and a Williams plasticity number of about 1.3 mm to 3.8 mm at 25° C. and
      (ii) 0.05 to two parts by weight of a methylvinyl(N-alkylacetamido)silane at a temperature within a range of about 20° C. to 80° C., for a period of time sufficient to increase the Williams plasticity number of the polymethylvinyl(methylfluoroalkyl)siloxane by chain extension,
   (B) mixing with the product of step (A)
      (i) 0.5 to 10 parts by weight of a hydroxyl end-terminated polydimethylsiloxane having about one to six mole percent pendant vinyl substituted on silicon and a Williams plasticity number within a range of about 1.2 mm to 2.5 mm at 25° C.,
      (ii) one to 10 parts by weight of a hydroxyl end-terminated polymethylfluoroalkylsiloxane fluid where the terminal hydroxyl substitution comprises about three to 10 weight percent of the fluid, and
      (iii) 20 to 50 parts of a reinforcing silica having a surface area within a range of about 50 m²/g to less than 200 m²/g, and
   (C) heating the mixture of step (B) to remove volatiles.

20. A method according to claim 19 further comprising adding in step (B), (iv) 0.25 to five parts by weight of a hydroxyl end-terminated polydimethylsiloxane fluid having about nine to 12 weight percent vinyl substituted on silicon and a viscosity of about 10 mPa·s to 60 mPa.s at 25° C.

21. A method according to claim 19, where component (A) (i) comprises about 0.5 to 0.8 mole percent pendant vinyl substituted on silicon and has a Williams plasticity number within a range of about 2.3 mm to 3.1 mm at 25° C., component (A) (ii) is methylvinyldi(N-methylacetamido)silane and comprises about 0.1 to 1.5 parts by weight per 100 parts of component (A) (i), and component (B) (ii) is described by formula $HO(MeR_fSiO)_nH$, where Me is methyl, Rf is 3,3,3-trifluoropropyl, and n has a value within a range of about three to six.

22. A method according to claim 21, comprising about three to six parts by weight of component (B) (ii) per 100 parts by weight of component (A) (i) and comprising about 25 to 35 parts by weight of component (B) (iii) per 100 parts by weight of component (A) (i).

23. A method according to claim 22, where the reinforcing silica has a surface area within a range of about 50 $m^2/g$ to 150 $m^2/g$.

24. A method according to claim 22, where the reinforcing silica has a surface area within a range of about 50 $m^2/g$ to 100 $m^2/g$.

25. A composition prepared by the method of claim 19.

26. A composition prepared by the method of claim 24.

* * * * *